US008914810B1

(12) United States Patent
Brockners

(10) Patent No.: US 8,914,810 B1
(45) Date of Patent: Dec. 16, 2014

(54) AUTOMATIC START-UP OF DEFAULT SERVICES FOLLOWING NOTIFICATION EVENT IN NETWORK ATTACHMENT SUBSYSTEM

(75) Inventor: Frank Brockners, Cologne (DE)

(73) Assignee: Cisco Technology, Inc., San Jose, CA (US)

( * ) Notice: Subject to any disclaimer, the term of this patent is extended or adjusted under 35 U.S.C. 154(b) by 1805 days.

(21) Appl. No.: 11/895,471

(22) Filed: Aug. 24, 2007

(51) Int. Cl.
  *G06F 3/00* (2006.01)
  *G06F 9/44* (2006.01)
  *G06F 9/46* (2006.01)
  *G06F 13/00* (2006.01)

(52) U.S. Cl.
  USPC ............................................................ 719/318

(58) Field of Classification Search
  CPC ........................................................ G06F 9/542
  See application file for complete search history.

(56) References Cited

PUBLICATIONS

Cisco Intelligent Services Gateway Overview; 8 pages; archived Jun. 23, 2006; http://replay.web.archive.org/20060623225853/http://www.cisco.com/application/pdf/en/us/guest/products/ps6588/c1244/cdccont_0900aecd804a3d4e.pdf.*
ISG Product Bulletin; Cisco Intelligent Services Gateway; Product Bulletin No. 3285; 4 pages; May 25, 2006; http://www.cisco.com/en/US/prod/collateral/iosswrel/ps6537/ps6549/ps6588/prod_bulletin0900aecd804a2c70.pdf.*
Listing of ISG Bulletins and corresponding dates; retrieved May 16, 2011; 1 page.*
Richard Brennan; ETSI NGN Work: TISPAN Status; May 2006; 19 pages.*
Final draft ETSI ES 282 004 V1.1.1; ETSI Standard; Telecommunications and Internet converged Services and Protocols for Advanced Networking (TISPAN); NGN Functional Architecture; Network Attachment Sub-System (NASS); Mar. 2006; 35 pages; http://www.etsi.org/deliver/etsi_es/282000_282099/282004/01.01.01_50/es_282004v010101m.pdf.*
Final draft ETSI ES 282 004 V2.0.0; ETSI Standard; Telecommunications and Internet converged Services and Protocols for Advanced Networking (TISPAN); NGN Functional Architecture; Network Attachment Sub-System (NASS); Nov. 2007; 42 pages; http://www.etsi.org/deliver/etsi_es/282000_282099/282004/02.00.00_50/es_282004v020000m.pdf.*

* cited by examiner

*Primary Examiner* — H S Sough
*Assistant Examiner* — Kimberly Jordan
(74) *Attorney, Agent, or Firm* — Baker Botts L.L.P.

(57) ABSTRACT

In one embodiment, a method includes receiving, by an application function (AF) implemented on a service node of a network, notification event information that includes an identification of a user, an Internet protocol (IP) address of user equipment (UE) associated with the user, and an event type, the notification event information being pushed by a network attachment subsystem (NASS) to the AF. Responsive to the notification event information flow, one or more default services specific to the user are enabled. It is emphasized that this abstract is provided to comply with the rules requiring an abstract that will allow a searcher or other reader to quickly ascertain the subject matter of the technical disclosure.

32 Claims, 5 Drawing Sheets

AUTOMATIC START-UP OF DEFAULT SERVICES FOLLOWING NOTIFICATION EVENT IN NETWORK ATTACHMENT SUBSYSTEM

TECHNICAL FIELD

The present invention relates generally to the field of data networks and communication systems; more particularly, to Next Generation Networking architectures.

BACKGROUND

Fixed and mobile communication systems are converging. Packet-based networks such as an Internet Protocol (IP) network now have the ability to packetize and transmit the data content of telephony communication. This configuration is known as a Voice over IP (VoIP) network, and can support voice, video, and/or data content. A variety of global standardization bodies have been created to set the standards for this convergence. For instance, the Alliance for Telecommunications Industry Solutions (ATIS) is a U.S.-based body that promotes technical and operations standards for the telecommunications and related information technologies industry worldwide. In addition, the Telecoms and Internet Converged Services and Protocols for Advanced Networks (TISPAN) group is a standardization body of the European Telecommunication Standard Institute (ETSI) specializing in fixed networks and Internet convergence. The network concept developed by ETSI TISPAN is commonly referred to as Next Generation Network (NGN). It leverages portions of the Internet Protocol Multimedia Subsystem (IMS) architecture as specified by the Third Generation Partnership Project (3GPP). The architecture of these systems typically provides users with services, such as security, charging, delivery of content data to the user devices by service providers, and/or session management to support the various services within that system.

BRIEF DESCRIPTION OF THE DRAWINGS

The present invention will be understood more fully from the detailed description that follows and from the accompanying drawings, which however, should not be taken to limit the invention to the specific embodiments shown, but are for explanation and understanding only.

DESCRIPTION OF EXAMPLE EMBODIMENTS

Figure 1:
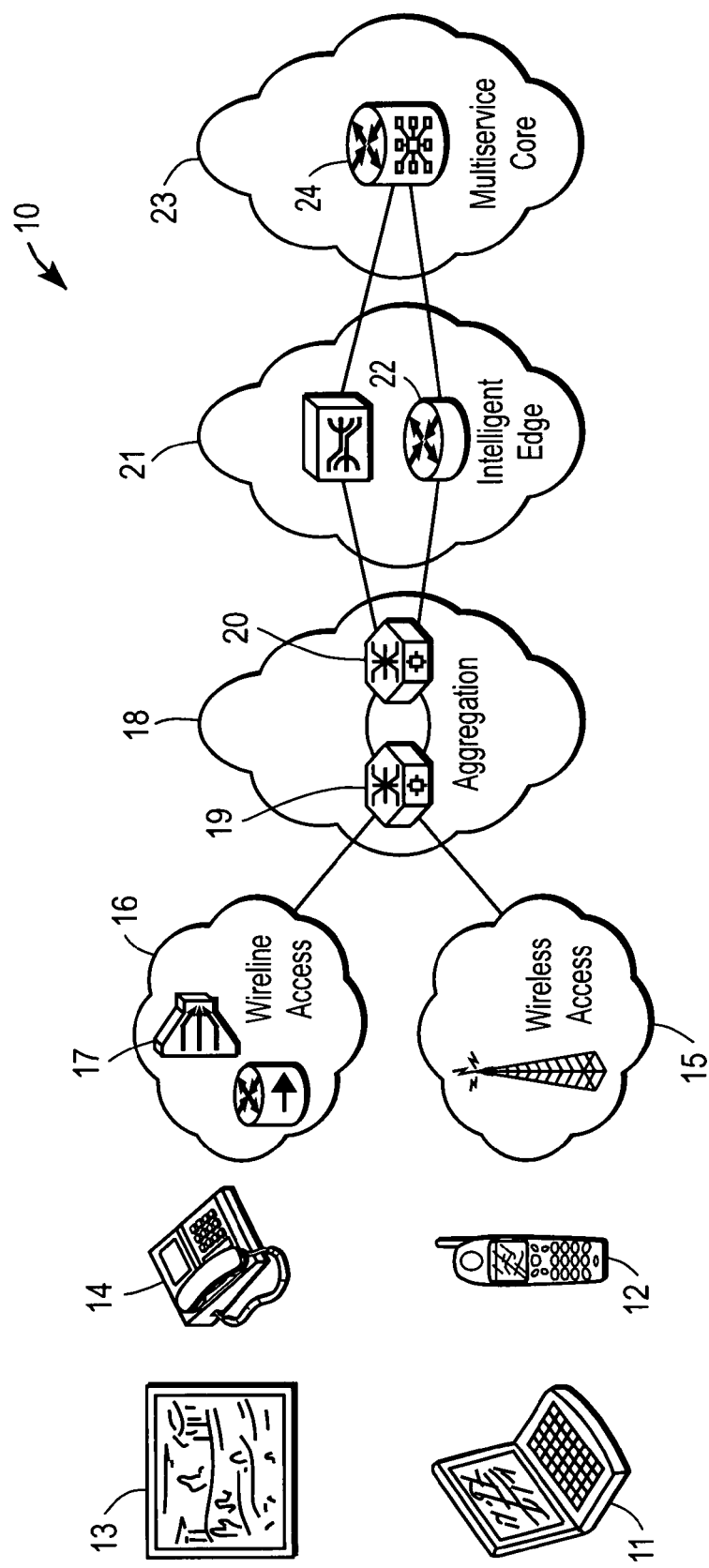
FIG. 1 illustrates an example network that provides multiple services to users.

In the following description specific details are set forth, such as device types, system configurations, communication methods, etc., in order to provide a thorough understanding of the disclosure herein. However, persons having ordinary skill in the relevant arts will appreciate that these specific details may not be needed to practice the embodiments described.

In the context of the present application, a communications network is a geographically distributed collection of interconnected subnetworks for transporting data between nodes, such as intermediate nodes and end nodes (also referred to as endpoints). A local area network (LAN) is an example of such a subnetwork; a plurality of LANs may be further interconnected by an intermediate network node, such as a router, bridge, or switch, to extend the effective "size" of the computer network and increase the number of communicating nodes. Examples of the devices or nodes include servers, mixers, control units, and personal computers. The nodes typically communicate by exchanging discrete frames or packets of data according to predefined protocols.

In one embodiment, a mechanism is provided to automatically start, stop, or modify certain (default) services in response to an event of an access network connected to a larger service provider (SP) network. Services and/or information are communicated or pushed from a Network Attachment Subsystem (NASS), which partially handles the user's access session (i.e., IP addressing, Authentication to the access network, etc.) to any subsystem or application function peering with the NASS. The triggering events may include a user successfully logging onto or connecting with the access network.

The term "default services" refers to application services or service functions within a service control subsystem which support application services that are automatically started once a user successfully registers with the access network. These default services are services controlled by the service control subsystem and are started prior to the user's successful registration to the service/application network domain (e.g., as done through the SIP REGISTER or related procedures). In one implementation, a set of services or applications may be automatically delivered to a customer (i.e., subscriber) in response to a logon event without the customer having to actively request or register for that service. In other words, a pre-registration or pre-configuration setting may be utilized to link a specific application service (or a set of application services) to a particular user of the access network and a corresponding logon event, which is passed from the access network to the application function. The registration procedure allows for notification of any application/service function which desires to receive a particular event occurring in the NASS, e.g., so that the appropriate default service can be started responsive to a user logging onto the access network.

In a specific embodiment, the default services may include Default Security Settings specific to the Service Control Subsystem/Application Function (AF). This could more generally be understood as application support services. Here, the access network notifies the server (e.g., a web portal, which fulfills the role of the AF in this example case) when a user with name "Username" has successfully established access to the access network following certain standardized procedures (e.g., ETSI ES 282 004). The AF may request appropriate security/firewall/gate settings be configured on the border gateway function(s), depending on policies and/or configuration of the AF.

In the context of the present application, an Application Function is a generic term representing any element of the service layer architecture offering (or providing access to) applications that require information about the characteristics of the IP-connectivity session used to access such applications. Examples of such Application Functions are the Proxy Call Session Control Function (P-CSCF), the Interconnect Border Control Function (IBCF), certain categories of Application Server Functions (ASF), a Presence Network Agent (PNA), a subscriber control server or a web portal.

Another default service may be a Default Service-Control-Subsystem controlled Bandwidth Service. In this embodiment, a default bandwidth-profile within the service control subsystem for an individual user is automatically activated. The bandwidth profile may comprise a service-stratum bandwidth profile that is different from the settings which are stored in the profile database of the access network. For instance, a user's default bandwidth-profile within the service control subsystem might be more sophisticated than the one in the access profile. For example, a user's default bandwidth-profile within the service control subsystem may be made to be a function of time; that is, dependent upon the date, time of day, and the overall logon duration.

In another embodiment, the default service may comprise an automatic start of a default Internet Protocol Television (IPTV) video stream (e.g., an advertisement or general announcements) that is delivered to the user without requiring the user's set-top box (STB) to actively contact the AF. IPTV is a known system where a digital television service is delivered using the Internet Protocol over a network infrastructure, which may include delivery by a broadband connection. For residential users, IPTV is often provided in conjunction with Video on Demand and may be bundled with Internet services such as Web access and VoIP.

In yet another embodiment, the default service may comprise support for a data application (e.g., time-based, prepaid, bandwidth-on-demand) that is unsupported by TISPAN NGN (Release 1). By way of example, the service provider (which is different from the actual access network provider) may want to offer a limited-time, high-speed data service to the customer. Such an offering may be used to inspire customers to migrate away from narrow-band ISDN dialup to broadband. The SP may offer a bandwidth profile that allows for, say, ten hours of high-speed Internet-access with the reduction back to 64 kbps once the ten hour limit has been exceeded. To implement this service model, the notification/trigger may be the user logging onto the access network or web portal.

Referring now to FIG. 1, an example network 10 is shown comprising a variety of different user devices (e.g., a laptop computer 11, a mobile phone 12, a VoIP phone 14, and a digital television 13) connected with a SP core network 23 (including a server 24) via wire line access network 16, wireless access network 15, aggregation network 18, and an intelligent edge network 21. By way of example, wireline access network 16 is shown including a Digital Subscriber Line Access Multiplexer (DSLAM) 17, aggregation network 18 is shown comprising aggregation connecting nodes 19 & 20, and intelligent edge network 21 is shown including provider edge (PE) device 22. Although four different user devices are illustrated in FIG. 1, any network interface device may be used to access any of the services delivered to the user's home or business, such as telephony, IPTV, Internet, or IP phone service. Other user devices may comprise set-top boxes, personal computers (PCs) and Session Initiation Protocol phones, as well as other types of intelligent network-interface devices that have yet to be developed.

In the example of FIG. 1, the user's access session (i.e., IP addressing, authentication to either of access networks 15 or 16, etc.) is handled by a Network Attachment Sub-System (NASS), which supports the sending of notification events to any subsystem or application function (AF) running "on top" of or peering with the NASS (e.g., at the service or application layer level). An example of a notification event is the successful logon of a user to the access network.

The Network Attachment Subsystem (NASS) provides registration at access level and initialization of User Equipment (UE) for accessing to the TISPAN NGN services. The NASS provides network level identification and authentication, manages the IP address space of the Access Network and authenticates access sessions. The NASS also announces the contact point of the TISPAN NGN Service/Applications Subsystems to the UE. It is appreciated that network attachment through NASS is based on implicit or explicit user identity and authentication credentials stored in the NASS.

It should be understood that other notification events need not be specific to network logon-triggered services; that is the notification service of NASS in this context is generic and is not linked to a specific application or use case. By way of further example, other events may include security-related events, e.g., intrusion detection, virus breakout, detection of anomalies in user behavior, etc. For instance, in a specific embodiment the triggering event may comprise the NASS detecting an anomaly in the user's behavior or traffic patterns, indicating that the user may either be violating certain rules/provisions of his subscription-contract, or that the user is infected with a virus.

Figure 2:
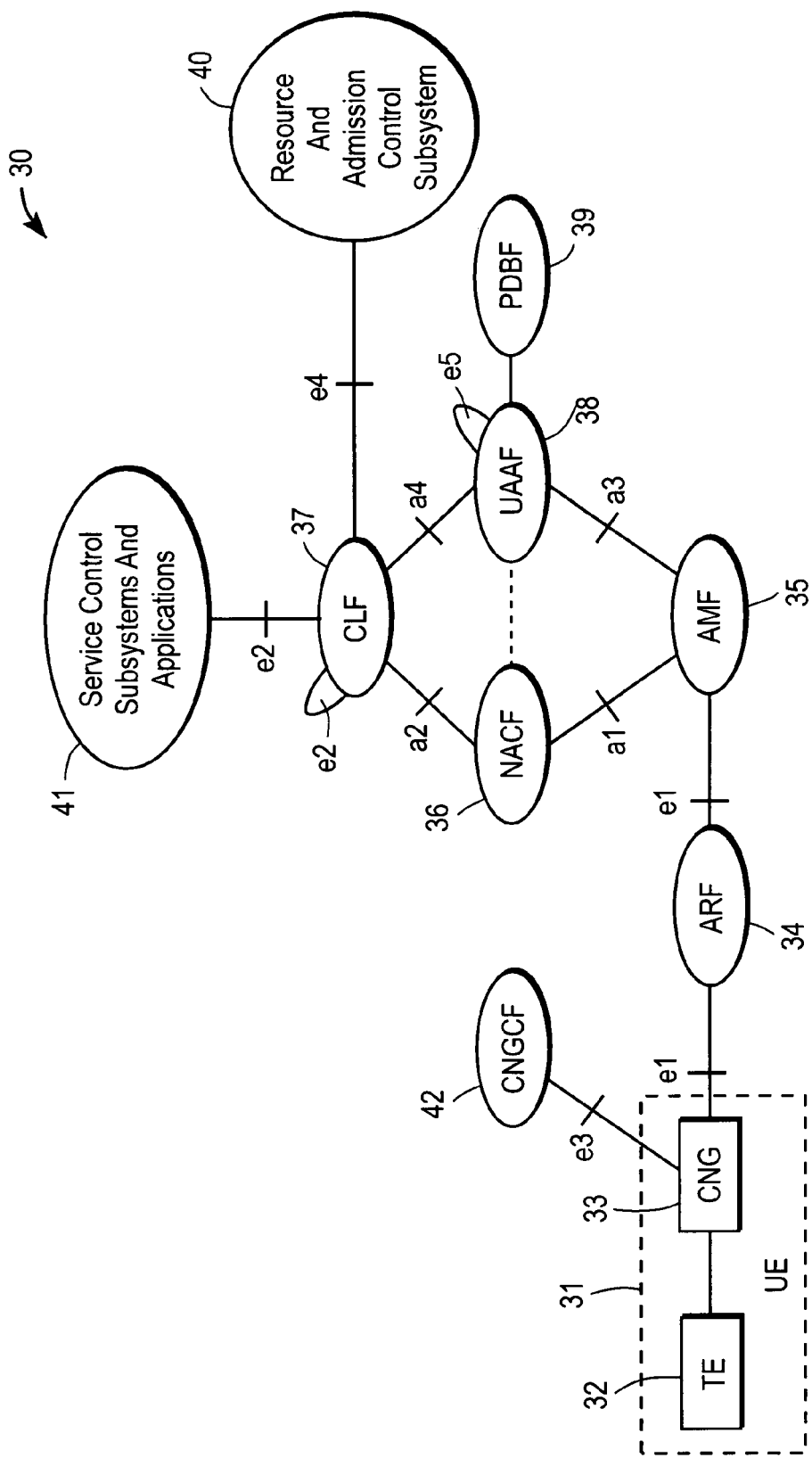
FIG. 2 illustrates an example TISPAN NGN NASS architecture.

FIG. 2 illustrates a functional TISPAN NGN NASS architecture 30 that includes user equipment (UE) 31 comprising terminal equipment (TE) 32 coupled with a customer network gateway (CNG) 33. By way of example, UE 31 may comprise one or more devices allowing a user to access services delivered by TISPAN NGN networks. UE 31 may therefore include a variety of devices under user control, such as consumer premises equipment (CPE), an Internet access device (IAD), a residential gateway (RGW) device, TE, etc.

Practitioners in the art will appreciate that the TISPAN NGN architecture allows for multiple operational domains, e.g., an access network domain and a service (or application) network domain. A user can have multiple subscriptions, e.g., one with an access network domain operator, as well as one or more subscriptions with service/application network domain operators. The access network domain provides the user with network connectivity and can also provide a set of services which are limited to the access network domain. The service network domain can use an end-to-end session orientated control protocol for end-to-end service creation, such as the session initiation protocol (SIP). Services delivered through the service network domain typically include voice services.

In one embodiment, the "e2" reference point between the NASS and Service Control Subsystems in NGN (release 1) is utilized to pass notification events from NASS to the AF. Specifically, the capabilities of the "e2" reference point are expanded to also support an event notification service from the NASS to Service Control Subsystems and/or Application Functions. The NASS may be locally configured with information enabling the NASS to determine which local events (e.g., a logon event, an event related to intrusion detection, etc.) are to be passed to which AF (as there might be multiple AFs). Alternatively, this determination may be made through a registration procedure from an AF. An AF may specify the particular notification events it is interested in as part of a registration procedure with the NASS. For the duration of the registration, NASS then passes the specified notification events to the AF that the AF has registered for.

In one embodiment, the e2 reference point includes the following additional new information flows: Event Registration (Request/Response), wherein the AF registers a Notification-Event type to the connectivity session location and repository function (CLF), which is part of NASS; Notification Event (Request/Response), wherein the CLF passes event information about a particular event to an AF, e.g. about the expiry of an event registration or simply the occurrence of an event. (Note that in FIG. 2, the NASS includes the various functions shown below the e2 cross-line, with the AF being referenced by numeral 41 above the e2 cross-line.)

In the embodiment described, the Event Registration Request information flow contains the following information: Subscription Duration, which is the duration for which the subscription for a particular event is active; Subscriber ID, which is the identity of the attached user (in case of user-specific events, such as in the user-logon event example); and Event-Type information (e.g. user logon event) and format for an Event Relay/Notification description and information identifying the AF (AF-Identity). The Event Registration Response information flow also contains Subscriber ID and Event-Type information. Additionally, the Event Registration Response information flow also contains Update Action information, which is the specified administrative action/information for an event (e.g. ACTIVATED, meaning that event registration was successfully received and Event Notification for "Event" activated); or SUBSCRIPTION-EXPIRED, meaning that the event subscription for "Event" has expired).

The NASS Notification Event Request information flow contains the Event-Type and Subscriber ID information, and also a Globally Unique Address, an Assigned IP Address, which is the IP address of the attached user equipment, and Address Realm information. The NASS Notification Event Response information flow contains the globally unique address, the subscriber ID information, the event type as well as a result code.

Practitioners in the art will appreciate that the foregoing flows allow applications to set concise/user specific security settings once the user logs on to the access network; set concise/user specific bandwidth profile settings once the user logs on to the network; build classic internet-access (time-limited high-bandwidth) use cases within the TISPAN architecture or other similar network architectures; trigger default "free" applications (e.g., free default video streams delivered to the home of a customer who does not yet have a subscription); and also enable presence-based enhancements where, once the user logs onto the access network, higher-layer service control subsystems are automatically made aware of where the user is located, and can customize their offerings accordingly.

The NASS architecture shown in FIG. 2 comprises the following functional entities: a CNG configuration function (CNGCF) 42, a connectivity session location and repository function (CLF) 37, a network access configuration function (NACF) 36, and a profile database function (PDBF) 39. CNGCF 42 is used in the initialization, configuration, and update of CNG 33. CNGCF 42 provides to CNG 33 additional configuration information (e.g., configuration of a firewall internally in the CNG, QoS marking of IP packets, etc.) and may also handle notifications from CNG 33 regarding terminal equipment availability.

CLF 37 registers the association between the IP address allocated to UE 31 and related network location information provided by NACF 36, i.e., access transport equipment characteristics, line identifier (Logical and Physical Access ID), IP Edge identity, etc. CLF 37 registers the association between network location and addressing information received from NACF 36 and geographical location information with the user profile received from user access authorization function (UAAF). CLF 37 also stores the profile of the user/UE 31 to which the IP address has been allocated (information received from UAAF 38, as well as the user network QoS profile and user preferences regarding the privacy of location information. In cases where CLF 37 does not already have the identity/profile of the user/UE available, CLF 37 may retrieve this information from UAAF 38. UAAF 38 performs user authentication, as well as authorization checking, based on user profiles, for network access. For each user, UAAF 38 retrieves authentication data and access authorization information from the user network profile information contained in PDBF 39. UAAF 38 may also perform the collection of accounting data for each user authenticated by NASS 30.

PDBF 39 is the functional entity that contains user authentication data (user identity, list of supported authentication methods, key materials etc.) and information related to the required network access configuration: these data are called "user network profile" or "access user profile". This profile may be optionally subdivided into sub-profiles, each of which is associated to one or more logical access identifiers. PDBF 39 response to queries from UAAF 38 under full profile or on a particular sub-profile. In the latter case, it is the responsibility of UAAF 38 (or the proxy-UAAF) to derive a sub-profile ID from the logical access ID.

Continuing with the example of FIG. 2, NASS 30 is further shown having interactions with the following standard TISPAN NGN functional entities: Service control subsystems and applications 41, resource admission control subsystem (RAGS) 40, access relay function (ARF) 34, and access management function (AMF) 35. The internal reference points for information flow between the above-described entities are shown in FIG. 2 by the reference points/connecting lines with associated letter-number labels (e.g., "e1", "a1", "e4", etc.). For example, reference point "a2" allows NACF 36 to register in CLF 37 the association between the allocated IP address and the user identity, as well as related location information (e.g., IP edge ID, line ID).

The CLF sends and receives information flows at the e2, e4, a2 and a4 reference points. The "e2" reference point between the NASS and the application domain enables applications and service control subsystems to retrieve from CLF 37 network location information, based primarily on the assigned IP address allocated to UE 31. Information flows used on the CLF to AF interface include: Location Information Query, Location Information Response, Event Registration Request, Event Registration Response, Notification Event Request and Notification Event Response. The Location Information Query contains the assigned IP address of the user equipment, the address realm (i.e., the addressing domain in which the IP address is significant), and the identity of the requesting application function. The Location Information Response contains the Subscriber ID (i.e., the identity of the attached user), and other optional information such as location information, the IP address of the RACS entity where the resource request is to be sent, the type of user equipment, and the type of access network over which IP connectivity is provided to the user equipment.

The Event Registration Request information flow sent by an AF to the CLF contains a Subscription Duration (i.e., the duration for which the subscription for particular event will be active), the Subscriber ID, and the Event or Event-Type (e.g., a user logon event), the globally unique address that corresponds to the UNI associated to the user attached to the network, and the identity of the AF. When an actual CLF event occurs, a Notification Event Request information flow is sent from the CLF back to the AF. The Notification Event Request flow includes the Event-Type, Subscriber ID, globally unique IP address, and, optionally, additional information related to the event, such as an update action. The Notification Event Response/Acknowledgement flow from the AF to the CLF includes the globally unique address, which comprises the assigned IP address of the attached user equipment, the address realm, which is the addressing domain to which the IP address is significant, the Subscriber ID, the Event-Type, and a Result Code (e.g., success, permanent failure, etc.).

Figure 3:
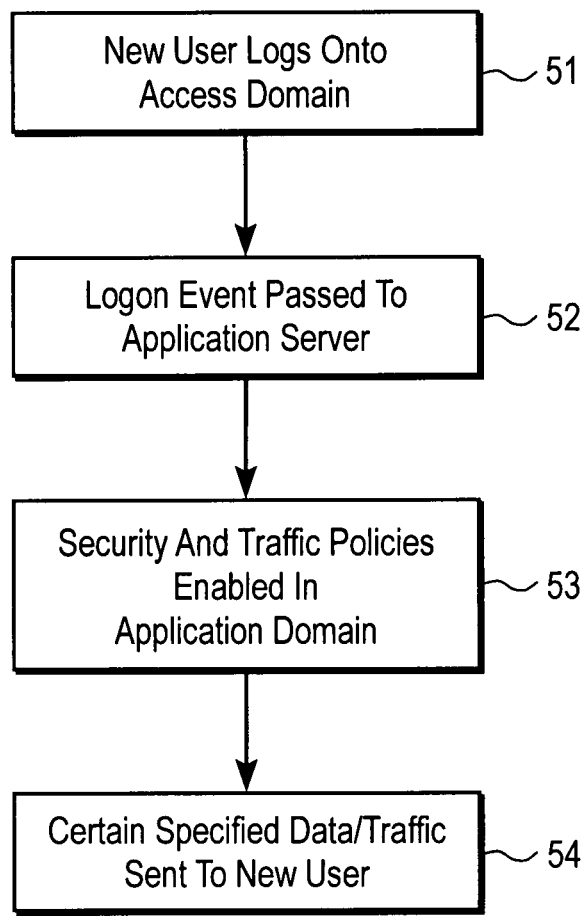
FIG. 3 illustrates an example method of operation for the network of FIG. 1.

FIG. 3 illustrates an example method of operation for the network of FIG. 1. The process starts with a new user ("new" with respect to certain network services) logging onto an access network/domain (block 51). This event, i.e., the user logging onto the access network, is automatically passed on to the application domain, e.g., an application server, via the e2 reference point (block 52). For instance, in one embodiment the NASS may be responsible for addressing the initial user subscription, point-to-point (PTP) session establishment, authentication, authorization of the user in the access domain. Once these initial tasks have been completed, the e2 reference point may apply the application functions; that is, provide an information query service where an application can query the NASS using an IP address and receive back certain user data, such as the physical port that the UE is connected to on a DSLAM of the access network, etc. The e2 reference point or interface—because it is between the access network and the application domain—is utilized to pass notification events, e.g., a new user or subscriber logs in to the access network. That event is passed over to the application domain, which can respond in a variety of different ways.

In the example of FIG. 3, in response to receiving the event (user log-on) the application server may enable certain security and traffic policies in the application domain (block 53), which, in one implementation, comprises a set of default security settings for the service control sub-system/application functions. For example, depending on policies of the AF and/or configuration of the AF, the AF may request appropriate security/firewall/gateway settings be configured on the border gateway function(s). In this example, the enablement of the default services or policies in the application domain results in certain specified data/traffic being sent to the new user (block 54).

In other embodiments, the application server may automatically start a default IP video stream (e.g., advertising), or automatically activate a default bandwidth-profile setting within the service control subsystem for the user, or open certain gateways, or adjust the security settings/policies, or offer a time-limited, pre-paid, high-speed data service to the user, or adjust QoS settings, or enable a timer that allows you to only access the network for a certain period of time. Therefore, the range and type of default settings/actions that may be taken in response to the event pushed from the NASS to the application domain/AF should not be considered as being limited to the specific embodiments described. Rather, the default services provided by the application server should be broadly understood as comprising any service or functional response within the capabilities of the SP network.

Figure 4:
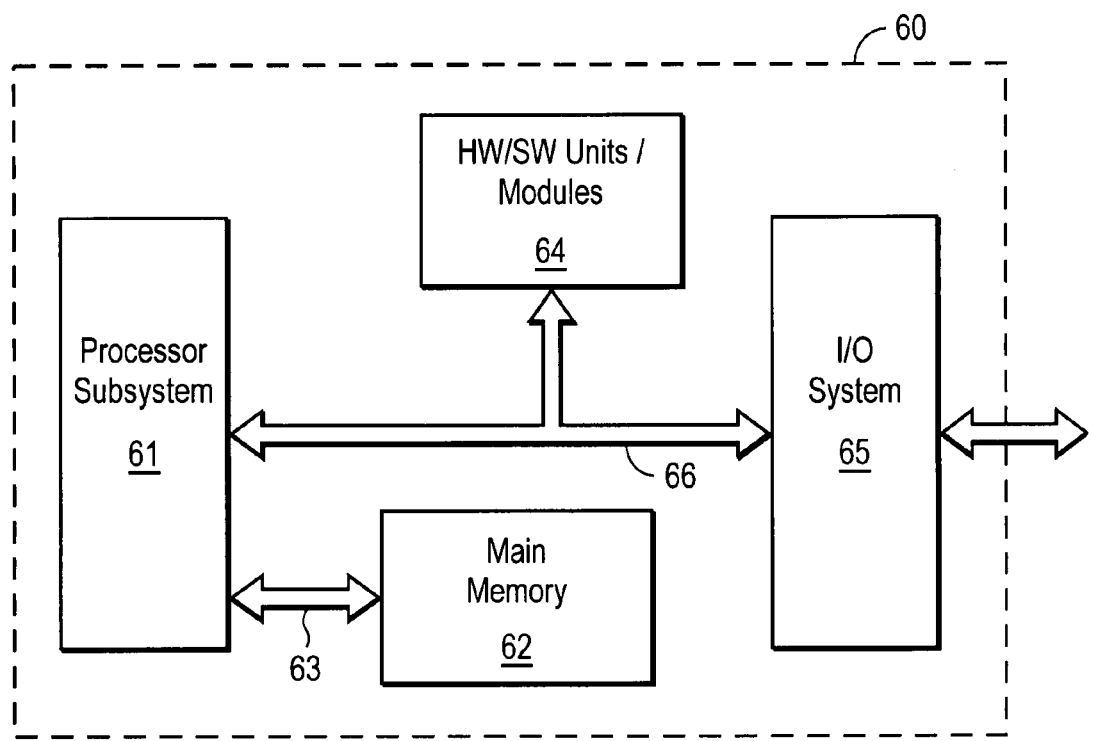
FIG. 4 illustrates an example network device or node.

FIG. 4 is a generalized block diagram showing an example network device or node 60, such as may comprise any of the nodes (e.g., a server), devices, or gateways shown or described above. Node 60 includes a processor subsystem 61 coupled with a main memory unit 62 via bus 63, and coupled to one or more hardware/software modules 64, and an input/output (I/O) interface 65 via a system bus 66. Modules 64 may include software, firmware, or logic embedded in hardware for implementing any of the functions described herein, e.g., those functions associated with providing default services in response to a notification event.

It is appreciated that any server or other network device incorporated within, or utilized by or in conjunction with, node 60 may comprise separate hardware devices coupled to the system bus 66, or, alternatively, implemented as software programs or modules 64 that run on one or more processors of subsystem 61. In other words, the functions described above, as well as other associated functions, may be implemented as separate hardware devices, memory locations (storing executable code), firmware devices, software modules, or other machine-readable devices. (In the context of the present application, therefore, the term "module" is to be understood as being synonymous with both hardware devices and computer-executable software code, programs or routines.)

Figure 5:
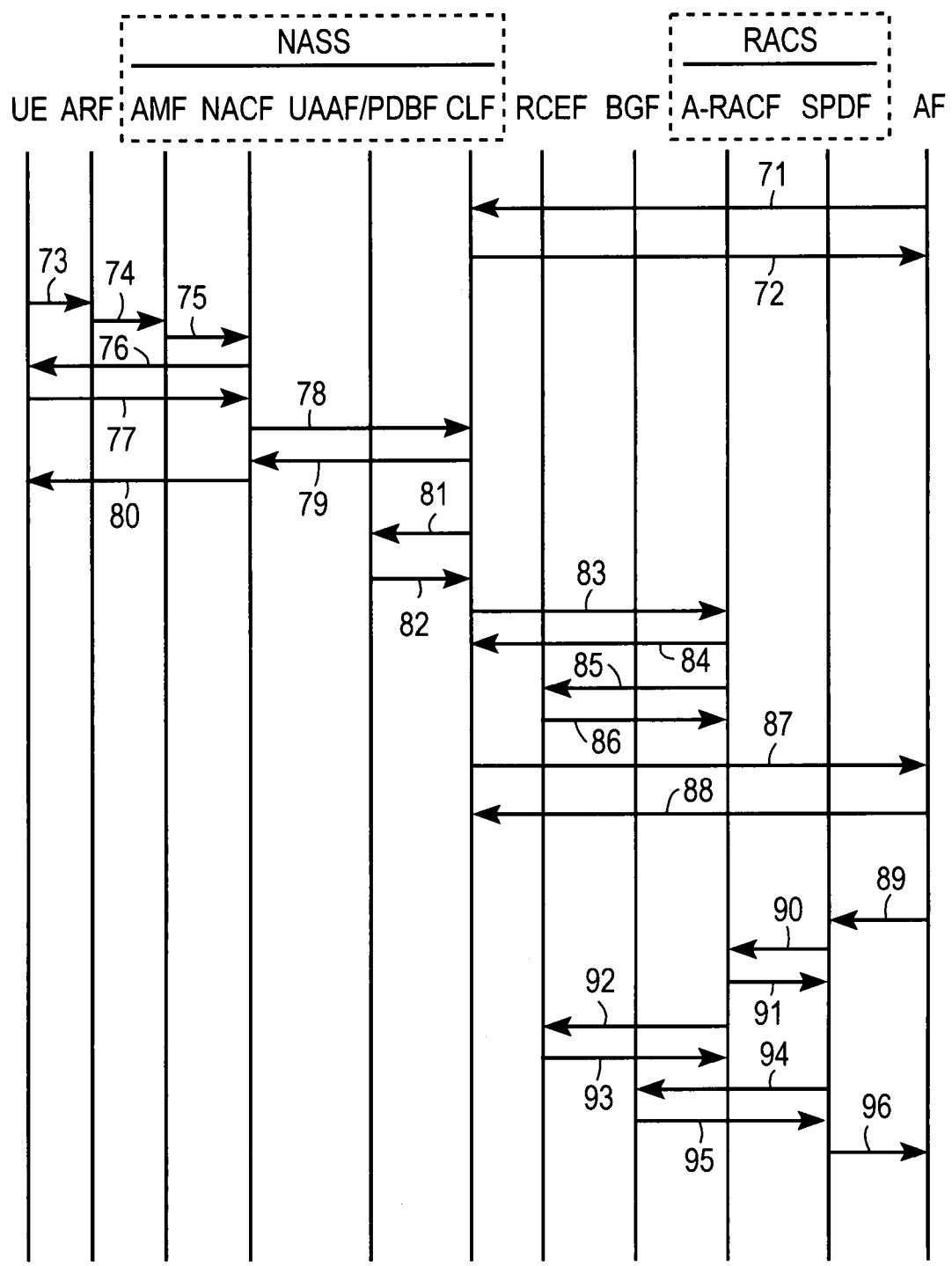
FIG. 5 is an example call flow that illustrates a method of operation for a NASS Notification Service in TISPAN.

FIG. 5 is an example call flow that illustrates a method of operation for a NASS Notification Service in TISPAN (release 2). The example assumes a setup with two different providers, an Access Network Provider (ANP) and a Service Provider (SP) that cooperate to deliver an Internet access service to a subscriber. In other words, the SP and ANP have a business relationship. The SP operates a subscriber control server (shown as AF in the diagram). A typical example of a subscriber control server is a web-portal. The ANP operates the access network control infrastructure, i.e., NASS (authentication, address and access-user-profile management) and RACS (resource admission and policy control). In this example, the subscriber has a subscription with the SP for internet access and attaches to the access network using DHCP and IP-sessions (PPP-free operation), thereby leveraging the infrastructure of the ANP. The subscriber performs implicit authentication to NASS (i.e., no explicit authentication procedure is performed). In addition, the subscriber is associated with an access-user-profile for ANP and a service-user-profile for SP. The access-user-profile and service-user-profile are not necessarily the same (here, the assumption is that they differ). Both profiles include security and QoS related definitions. Once the subscriber attaches to the network, the ANP applies the security and QoS settings which are derived from the service-user-profile, as defined by the SP.

Note further that in the example of FIG. 5 the SP desires to apply its own security and QoS settings, based on the service-user-profile of the subscriber. The service-user-profile should be applied as soon as possible after the subscriber attaches to the network. It should be understood that the subscriber does not send an explict message to the subscriber control server once the subscriber attaches to the network. The NASS notification service is used to notify the subscriber control server once the subscriber attaches to the network. The NASS notification service allows the ANP to inform the SP that a subscriber has successfully attached to the network. This enables the SP to request the security and QoS related settings, as specified in his service-user-profile to be applied for the particular subscriber.

The process shown in FIG. 5 begins with an Event Registration Request from AF to CLF to receive "Network Logon Events" (arrow 71). The Event Registration Response from CLF to AF is shown by arrow 72. A Dynamic Host Configuration Protocol (DHCP) DISCOVER message is then sent from UE to ARF (e.g. a DSLAM), indicated by arrow 73. ARF inserts location information (e.g., Logical-ID, such as the port of the access shelf to which the subscriber is connected) into Option-82 of DHCP DISCOVER (arrow 74). AMF receives DHCP DISCOVER and forwards to NACF (e.g. DHCP server), which step is shown by arrow 75. (Note that this example does not use explicit authentication; that is, AMF does not take an active role in this example call flow. Typically it would handle the authentication of the access session.)

Next, NACF sends DHCP OFFER to UE (arrow 76). UE responds with DHCP REQUEST to NACF (arrow 77). Arrow 78 represents from NACF to CLF a Bind request (containing IP-address, Logical-ID, Terminal type, etc.) to notify CLF that a new address has been handed out. Bind acknowledgement from CLF to NACF, confirming the receipt of the information is shown by arrow 79. DHCP Acknowledgement (ACK) sent from NACF to UE is shown by arrow 80. UE now owns a valid IP address allowing access into the access network.

User-Profile Pull (containing e.g., Logical ID to identify the appropriate user) from CLF to UAAF (which is typically a Radius/AAA server) is indicated by arrow 81. This allows the CLF to receive the user profile which corresponds to the newly allocated IP-address. User-Profile Push (QoS, Security ACL, etc.) occurs next from UAAF to CLF (arrow 82). The Logical-ID is used in this example to correlate the IP-address information received from the NACF with the Access-User-Profile received from UAAF. Note that the interaction between UAAF and the PDBF (e.g., the Radius Database) is not explicitly shown for sake of simplicity.

Continuing with the example of FIG. 5, arrow 83 shows User-Profile Push Notification Request (PNR) from CLF to A-RACF (Access Resource Admission Control Function). In this step the CLF forwards the relevant portions of the access-user-profile to the RAGS (resource admission control subsystem) to make the RACS aware of the new subscriber session and to also allow RACS (if so required) to install the appropriate initial gate settings (e.g., for security purposes) as well as the initial QoS settings. User-Profile Push Notification Answer (PNA) from A-RACF to CLF to confirm the receipt of the user-access-profile is shown by arrow 84.

Policy Install Request (PIR) from A-RACF to Resource Control Emulation Function (RCEF) occurs next (arrow 85). In this step the A-RACF installs the appropriate QoS and security settings for the newly established access session in RCEF. The settings reflect what is stated in the access-user-profile stored in the PDBF, which is owned and controlled by the Access Network Provider (ANP). The ANP operates access network control infrastructure, i.e., NASS (authorization, address and access-user-profile management) and RACS (resource admission and policy control). Arrow 86 indicates Policy Install Answer (PIA) from RCEF to A-RACF.

Given that the AF has already registered to receive logon-events (i.e., a subscriber attaches successfully to the network), CLF is now operable to notify the corresponding AF when such an event occurs. This involves an Event Notification Request (Logon-Event, IP-Address, Logical-ID) being sent from the CLF to the AF (e.g., a subscriber control server, see arrow 87). AF responds to CLF with an Event Notification Response (arrow 88). The AF (e.g., a subscriber control server, portal) then correlates the event to a subscriber and an associated service-user-profile. In this example, the Logical-ID is used to correlate the service-user-profile to the newly received event. This allows the AF to derive the appropriate security and QoS settings for this particular subscriber.

The AF now installs the appropriate QoS and security settings for the subscriber according to the definitions in the service-user-profile (arrow 89). AF does so by forming an AA-Request (AAR) to the RACS, or more specifically, the AF sends an AAR to the Service Policy Decision Function (SPDF). The AAR contains a description of the required QoS as well as security settings. SPDF decides which portions of the QoS and security setting should be applied within the Border Gateway Function (BGF) and which is to be handled by the A-RACF. The portion which is to be handled by the A-RACF is included in an AA-Request from SPDF to A-RACF (arrow 90). The AA-Answer from A-RACF to SPDF is shown by arrow 91. The A-RACF transforms the QoS and security request into a Policy Install Request (PIR) which is sent from A-RACF to RCEF (arrow 92). This updates the initial settings, which were configured previously (arrows 85, 86). The Policy Install Answer (PIA) from RCEF to SPDF is shown by arrow 93. An Open Gates (Security Settings) and install QoS-Setting request is then sent from SPDF to BGF (arrow 94). The BGF to SPDF response is shown by arrow 95. Finally, an AA-Answer is sent from SPDF to AF to acknowledge the successful installation of security and QoS policies in the BGF (arrow 96).

It should also be understood that elements of the present invention may also be provided as a computer program product which may include a machine-readable medium having stored thereon instructions which may be used to program a computer (e.g., a processor or other electronic device) to perform a sequence of operations. Alternatively, the operations may be performed by a combination of hardware and software. The machine-readable medium may include, but is not limited to, floppy diskettes, optical disks, CD-ROMs, and magneto-optical disks, ROMs, RAMs, EPROMs, EEPROMs, magnet or optical cards or other type of machine-readable medium suitable for storing electronic instructions.

Additionally, although the present invention has been described in conjunction with specific embodiments, numerous modifications and alterations are well within the scope of the present invention. Accordingly, the specification and drawings are to be regarded in an illustrative rather than a restrictive sense.

I claim:

1. A method comprising:
    sending, by an application function (AF) implemented on a service node of a network, an event registration information flow to a network attachment subsystem (NASS);
    receiving, by the application function (AF) implemented on a service node of a network, a notification event information flow in which the NASS passes event information about a particular event to the AF, the notification event information flow including an event-type, an ID associated with a subscriber, and a globally unique address; and
    automatically enabling one or more default services for the subscriber responsive to the notification event information flow without requiring the subscriber to initiate contact with the AF.

2. The method of claim 1 wherein the event registration information flow further includes a duration for which a subscription for the particular event is to remain active.

3. The method of claim 1 wherein the particular event comprises a user-logon to an access network.

4. The method of claim 1 wherein the particular event comprises a security-related event.

5. The method of claim 1 wherein the one or more default services comprises default security settings for a service control sub-system.

6. The method of claim 1 wherein the one or more default services comprises activating a default bandwidth-profile within a service control sub-system for the subscriber.

7. The method of claim 6 wherein the default bandwidth-profile differs from a setting for the subscriber stored in a profile database.

8. The method of claim 1 wherein the event type comprises a user-logon event and the one or more default services an offer of a limited-time, high-speed data service to the subscriber.

9. The method of claim 1 wherein the one or more default services includes delivery of a default Internet protocol television (IPTV) video stream to the subscriber.

10. The method of claim 1 wherein the event registration information flow is sent before the subscriber is known to the AF.

11. The method of claim 1 wherein:
the event registration information flow is received by a connectivity session location and repository function (CLF) of the NASS; and
the notification event information flow is sent by the CLF of the NASS to the AF.

12. The method of claim 1 wherein the event registration information flow includes an identification (ID) associated with a subscriber, event-type information, and an Internet protocol (IP) address of user equipment (UE) associated with the subscriber.

13. A computer-implemented method comprising:
receiving, by a network attachment subsystem (NASS), a specification of one or more notification events from an application function (AF) of a service provider (SP) network as part of a registration procedure between the AF and the NASS;
sending event notification information from the NASS to the AF responsive to occurrence of a notification event; and
enabling one or more default application services for a user of an access network responsive to the occurrence of the notification event, the one or more default application services being automatically provisioned to the user without requiring the user or user equipment to initiate contact with the AF.

14. The computer-implemented method of claim 13 wherein the notification event comprises a security-related event.

15. The computer-implemented method of claim 13 wherein the notification event comprises a logon event of the user.

16. The computer-implemented method of claim 13 wherein the specification further comprises a duration for which the one or more default application services is to be active.

17. The computer-implemented method of claim 13 wherein the specification further comprises an identity of the user.

18. The computer-implemented method of claim 13 wherein the AF comprises an application server.

19. The method of claim 13 wherein the receiving of the specification occurs before the user is known to the AF.

20. An apparatus comprising:
one or more processors; and
a memory comprising one or more instructions executable at the processors, the processors operable when executing the instructions to:
receive event registration information from an application function (AF) of a service provider (SP) network, wherein the event registration information identifies one or more notification events about which the AF is to be notified;
communicate notification event information to a server providing the application function (AF) responsive to an occurrence of at least one of the one or more notification events, wherein the notification event information includes an event-type; and
provision one or more default application services associated with user equipment (UE) of a user connected with a service provider (SP) network via an access/aggregation network responsive to the notification event, the one or more default application services being automatically provisioned to the user without requiring the user or the UE to initiate contact with the AF.

21. The apparatus of claim 20 wherein the one or more processors, when executing the instructions, is further operable to receive a query from the server using an Internet protocol (IP) address of the UE, and send back certain user data that includes a physical port that the UE is connected to on a node of the access/aggregation network.

22. The apparatus of claim 20 wherein the event-type comprises a user-logon event wherein the user logs onto the access network.

23. The apparatus of claim 20 wherein the one or more default application services comprises a security setting for a service control sub-system.

24. The apparatus of claim 20 wherein the one or more default application services comprises activation of a bandwidth-profile within a service control sub-system for the user.

25. The apparatus of claim 20 wherein the one or more default services includes delivery of a default Internet protocol television (IPTV) video stream to the subscriber.

26. The apparatus of claim 20 wherein the receiving of the specification occurs before the user is known to the AF.

27. An apparatus comprising:
one or more processors; and
a memory comprising one or more instructions executable at the processors, the processors operable when executing the instructions to:
receive a specification including one or more notification events from an application function (AF) of a service provider (SP) network as part of a registration procedure;
send information to the AF responsive to occurrence of a notification event; and
enable one or more default services specific to a user responsive to the occurrence of the notification event without requiring user equipment (UE) to initiate contact with the AF.

28. The apparatus of claim 27 wherein the notification event comprises a logon event of the user.

29. The apparatus of claim 27 wherein the specification further includes a duration for which the one or more default services is to be active.

30. The apparatus of claim 27 wherein the specification further includes an identity of the user.

31. The apparatus of claim 27 wherein the one or more default services includes delivery of a default Internet protocol television (IPTV) video stream to the subscriber.

32. The apparatus of claim 27 wherein the specification is received before the subscriber is known to the AF.

* * * * *